Dec. 9, 1952 E. L. C. WHITE 2,621,292

ELECTRICAL INTEGRATING CIRCUIT ARRANGEMENT

Filed Feb. 10, 1948

Inventor:
Eric Lawrence Casling White
By J. O. Ollier
Attorney

Patented Dec. 9, 1952

2,621,292

UNITED STATES PATENT OFFICE 2,621,292

ELECTRICAL INTEGRATING CIRCUIT ARRANGEMENT

Eric Lawrence Casling White, Iver, England, assignor to Electric & Musical Industries Limited, Hayes, England, a company of Great Britain Application February 10, 1948, Serial No. 7,482
In Great Britain February 11, 1947

6 Claims. (Cl. 250—27)

This invention relates to electrical integrating circuit arrangements and has particular but not exclusive reference to the generation of sawtooth scanning waveforms for use in television.

It is known that a strictly linear sawtooth waveform may be undesirable for scanning purposes because it does not necessarily give rise to a truly linear movement of the cathode ray beam across the surface to be scanned.

It is the object of this invention to provide an integrating circuit arrangement which can be employed for introducing a desired variation into an applied waveform or signal and in particular for generating a non-linear sawtooth waveform so as to give rise to a substantially linear movement of the cathode ray beam across the surface to be scanned.

According to the invention there is provided an integrating circuit arrangement comprising a first integrating circuit and a second integrating circuit, means for feeding to said second integrating circuit a part of whole of the output of said first integrating circuit and means for combining an output derived from said second integrating circuit with an output derived from said first integrating circuit and for applying said combined outputs to said first integrating circuit so as to be integrated thereby. With a circuit arrangement in accordance with the invention it is possible to generate a waveform which varies substantially as a sinusoidal function of time having an amplitude which is an exponential function of time. When applied for the generation of sawtooth scanning waveforms the first integrating circuit is arranged to integrate a potential for a predetermined time after which the integration is interrupted in known manner so as to generate a sawtooth waveform. This sawtooth waveform is then modified in accordance with the invention so as to produce a non-linear sawtooth waveform, the long flank of which varies as a sinusoidal function of time having an amplitude which is an exponential function of time.

Figure 1:
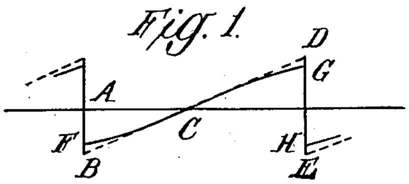
Figure 2:
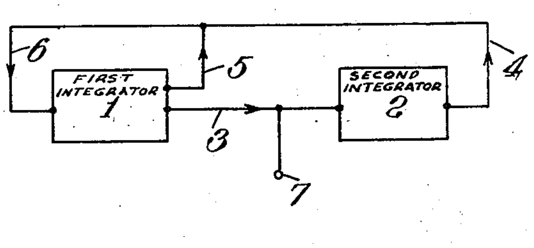
Figure 3:
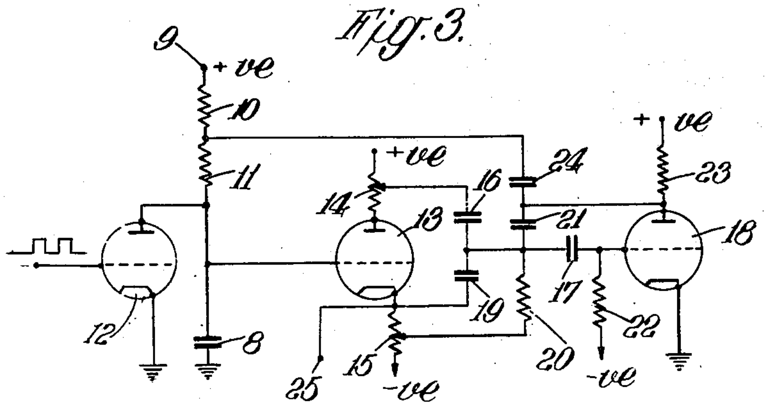

In order that the said invention may be clearly understood and readily carried into effect, it will now be more fully described with reference to the drawings which illustrate the invention as applied to the generation of scanning waveforms and in which:

Figure 1 illustrates a scanning waveform generated by a circuit arrangement according to the invention, Figure 2 is a block diagram illustrating the principle of the invention, and Figure 3 illustrates a detailed circuit arrangement in accordance with the invention.

Referring to Figure 1, the dotted line ABCDE represents a linear sawtooth scanning waveform of the type commonly employed for deflecting a cathode ray beam. When such a waveform is employed to deflect a beam where the deflection of the beam on the screen of the cathode ray tube is not linearly proportional to the deflection current, a truly linear scanning movement is not obtained. In order to obtain a linear scan it is necessary to compensate for the increase in deflection sensitivity by employing a non-linear deflection waveform such as that shown by the curve AFCGH.

In order to generate such a non-linear waveform an integrating circuit arrangement shown in block form in Figure 2 is employed. As shown in this figure a first integrating circuit 1 is arranged to integrate a constant potential, the integrated output from the circuit, which is of sawtooth waveform, being fed through a channel 3 to a second integrating circuit 2. An output from the integrating circuit 2, which is thus the integral of the output of the circuit 1, is fed through channel 4 and is combined with a portion of the output from the integrating circuit 1 which is fed to channel 4 from channel 5. The sum of these two integrated outputs is applied, by way of channel 6, to the input of the integrating circuit 1. An output scanning waveform is set up at the terminal 7, and is in general a substantially sinusoidal waveform the amplitude of which varies exponentially with time. The amount by which the scanning waveform departs from a truly linear form depends upon the amplitude of the two integrated outputs fed to the integrating circuit 1.

Figure 3 illustrates a circuit arrangement operating according to the principle of Figure 2 and, as shown, comprises an integrating condenser 8 which is arranged to be charged from a source (not shown) of constant positive potential connected to terminal 9 through the charging resistors 10 and 11 connected in series, the condenser 8 being periodically discharged by a thermionic valve 12, which is rendered conducting periodically by the pulses shown, so that a substantially sawtooth voltage variation is set up across the condenser. The voltage set up across the condenser 8 is applied to the control electrode of a valve 13 which is provided with an anode load resistor 14 and a cathode load resistor 15. An adjustable tapping point on the resistor 14 is connected through a condenser 16 and a coupling condenser 17 to the control electrode of a further valve 18. The cathode end of resistor 15 is connected by way of condensers 19 and 17 to the control electrode of valve 18. An adjustable tapping point on the resistor 15 is connected through a charging resistor 20 to an integrating condenser 21 which is connected between the anode and control electrode of the valve 18. The control electrode of valve 18 is connected through a resistor 22 to a suitable bias potential. An output derived from the anode load resistor 23 is fed by way of condenser 24 and the junction of resistors 10 and 11 to the control electrode of valve 13. With the circuit shown in Figure 3, but with condenser 24 temporarily disconnected, a substantially linear sawtooth waveform as ABCDE (Figure 1) would be generated across condenser 8 and at the cathode of valve 13, and in reverse phase at the anode of valve 13. The valve 18 acts in known manner, see for example the specification of British Patent No. 580,527, to integrate in condenser 21 currents applied to the control electrode of valve 18. Three sources of such currents are provided, namely the currents flowing through condensers 16 and 19 and resistor 20. The apparent input impedance of valve 18 is very low owing to negative feedback from the anode of valve 18 to its control electrode via condenser 21 so that said currents depend substantially only on the waveforms applied to condensers 16 and 19 and resistor 20, and their respective vector impedances.

The condensers 16 and 19 and the resistance 20 form differentiating circuits so that there will be fed to the valve 18 components in opposite phases the resultant of which represents the time differential of the sawtooth waveform set up in valve 13. The relative amplitudes of the waveforms applied to condensers 16 and 19 are varied by varying the tap on resistor 14 so that a resultant output is obtained which is positive or negative or zero. This time differential component is integrated to set up a sawtooth component across condenser 21.

A sawtooth current component is applied from the resistor 15, which is adjustable to vary the amplitude of said component, through the resistor 20 to be integrated to give a parabolic component at the anode of valve 18.

The two components, sawtooth and parabolic, are now fed back to the original integrating circuit assuming that the condenser is reconnected, and are integrated to give respectively parabolic and cubic components across condenser 8 and also at the cathode of valve 13. If the amplitudes of these components are small compared with the amplitude of the sawtooth, the argument remains substantially true even though the waveforms applied to valve 18 are now modified. Thus the cubic component at terminal 25 may be adjusted in amplitude by varying the tap on resistor 15 to give the waveform AFCGH (Figure 1). The parabolic component may be required if the original sawtooth is not quite linear, e. g., due to its amplitude across condenser 8 being an appreciable fraction of the supply potential at 9. A parabolic component may also be required for giving a linear scan on a cathode ray tube screen which is not normal to the axis of the electron gun, or if the patch to be scanned has its centre displaced from the intersection of the screen and the gun axis.

If the amplitudes of the modifying components added to the original sawtooth at the cathode of valve 13 are not small compared with the original sawtooth amplitude, it may be shown that the general waveform at said cathode, in any one period between the interruptions caused by the discharging pulses applied to valve 12, is either that of a sinusoid with exponential decay or growth, or the sum of two exponentials. In fact, it is the general solution of a second order linear differential equation.

Although the invention has been described above as applied to the generation of sawtooth scanning waveforms it will be understood that the invention is not to be limited thereto since the principle of the invention, that it to say, integrating an integrated output from a first integrating circuit in a second integrating circuit and then combining an output from the second integrating circuit with an output from the first integrating circuit and applying said combined output to the first integrating circuit, can be employed to introduce a desired variation into any applied waveform or signal.

What I claim is:

1. An integrating circuit arrangement comprising a first integrator having an input circuit and an output circuit, a connection from said output circuit to said input circuit, a second integrator having an input circuit and an output circuit, a connection from the output circuit of said first integrator to the input circuit of said second integrator, and a connection from the output circuit of said second integrator to the input circuit of said first integrator.

2. An integrating circuit arrangement comprising a first integrator, means for feeding a potential to said integrator, means for periodically discharging said integrator to generate a sawtooth waveform, a second integrator, means for applying said sawtooth waveform to said second integrator, means for feeding said sawtooth waveform to said first integrator, and means for feeding the integrated output of said second integrator to said first-mentioned integrator.

3. An integrating circuit arrangement comprising a first integrator having an input circuit and an output circuit, a differentiating circuit having an input circuit and an output circuit, means connecting the output circuit of said integrator to the input circuit of said differentiating circuit, a second integrator having an input circuit and an output circuit, means for connecting the output circuit of said differentiating circuit to the input circuit of said second integrator, means coupling the output circuit of said first integrator to the input circuit of said second integrator, and means connecting the output circuit of said second integrator to the input circuit of said first integrator.

4. An integrating circuit arrangement according to claim 3, said first integrator being connected to a source of potential, and means for periodically discharging said integrator to generate a sawtooth waveform.

5. An integrating circuit arrangement comprising a first integrator having an input circuit and an output circuit, a thermionic valve, said output circuit being connected to said thermionic valve, an anode load impedance for said valve, a cathode load impedance for said valve, a second integrator having an input circuit and an output circuit, a connection from a point on said cathode load impedance to the input circuit of said second integrator, a differentiating circuit having an input circuit and an output circuit, a connection from said anode load impedance to the input circuit of said differentiating circuit, a connection from the cathode end of said cathode load impedance to the input circuit of said differentiating circuit, means connecting the output circuit of said differentiating circuit to the input circuit of said second integrator, and means coupling the output circuit of said second integrator to the input circuit of said first integrator.

6. An integrating circuit arrangement according to claim 5, said first integrator being connected to a source of potential, and means for periodically discharging said integrator to generate a sawtooth waveform.

ERIC LAWRENCE CASLING WHITE.

REFERENCES CITED

The following references are of record in the file of this patent:

UNITED STATES PATENTS

| Number | Name | Date |
|---|---|---|
| 1,315,539 | Carson | Sept. 9, 1919 |
| 2,532,534 | Bell | Dec. 5, 1950 |

FOREIGN PATENTS

| Number | Country | Date |
|---|---|---|
| 580,527 | Great Britain | Sept. 11, 1946 |